US008566103B2

(12) United States Patent
He

(10) Patent No.: US 8,566,103 B2
(45) Date of Patent: Oct. 22, 2013

(54) MULTI-MODAL WEB INTERACTION OVER WIRELESS NETWORK

(75) Inventor: Liang He, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/976,320

(22) Filed: Dec. 22, 2010

(65) Prior Publication Data

US 2011/0202342 A1    Aug. 18, 2011

Related U.S. Application Data

(63) Continuation of application No. 10/534,661, filed as application No. PCT/CN02/00807 on Nov. 13, 2002.

(51) Int. Cl.
| | |
|---|---|
| *G10L 21/00* | (2013.01) |
| *G10L 11/00* | (2006.01) |
| *G10L 15/00* | (2013.01) |
| *G10L 15/26* | (2006.01) |
| *G10L 17/00* | (2013.01) |
| *G10L 15/04* | (2013.01) |

(52) U.S. Cl.
USPC ........ 704/270.1; 704/231; 704/235; 704/246; 704/251; 704/200; 704/270; 704/272; 704/275; 704/277

(58) Field of Classification Search
USPC ............. 704/200, 270, 270.1, 272, 275, 251, 704/231, 235, 246, 277; 715/853, 738
See application file for complete search history.

(56) References Cited

U.S. PATENT DOCUMENTS

| | | | | |
|---|---|---|---|---|
| 5,748,186 | A | * | 5/1998 | Raman .......................... 715/236 |
| 5,819,220 | A | | 10/1998 | Sarukkai et al. |
| 5,867,160 | A | * | 2/1999 | Kraft et al. .................... 715/803 |
| 5,915,001 | A | | 6/1999 | Uppaluru |
| 5,982,370 | A | * | 11/1999 | Kamper ........................ 715/760 |
| 6,031,836 | A | * | 2/2000 | Haserodt ....................... 370/389 |
| 6,101,472 | A | | 8/2000 | Giangarra et al. |
| 6,101,473 | A | | 8/2000 | Scott et al. |
| 6,185,535 | B1 | * | 2/2001 | Hedin et al. .................. 704/270 |
| 6,192,339 | B1 | * | 2/2001 | Cox .............................. 704/270 |
| 6,298,326 | B1 | * | 10/2001 | Feller ........................... 704/270 |
| 6,571,282 | B1 | * | 5/2003 | Bowman-Amuah .......... 709/219 |
| 6,597,280 | B1 | * | 7/2003 | Daniel ......................... 340/7.43 |
| 6,760,697 | B1 | * | 7/2004 | Neumeyer et al. ............ 704/201 |
| 6,865,258 | B1 | * | 3/2005 | Polcyn ....................... 379/88.01 |

(Continued)

FOREIGN PATENT DOCUMENTS

EP    1255194 A2    5/2002

OTHER PUBLICATIONS

Raymond Lau, Giovanni Flammia, Christine Pao, Victor Zue, WebGALAXY: beyond point and click—a conversational interface to a browser, Computer Networks and ISDN Systems, vol. 29, Issues 8-13, Sep. 1997, pp. 1385-1393.*

(Continued)

*Primary Examiner* — Edgar Guerra-Erazo
(74) *Attorney, Agent, or Firm* — Barnes & Thornburg LLP

(57) ABSTRACT

A system, apparatus, and method is disclosed for receiving user input at a client device, interpreting the user input to identify a selection of at least one of a plurality of web interaction modes, producing a corresponding client request based in part on the user input and the web interaction mode; and sending the client request to a server via a network.

20 Claims, 7 Drawing Sheets

(56) References Cited

U.S. PATENT DOCUMENTS

| | | | |
|---|---|---|---|
| 6,912,581 B2* | 6/2005 | Johnson et al. | 709/228 |
| 6,961,895 B1* | 11/2005 | Beran et al. | 715/203 |
| 6,976,081 B2* | 12/2005 | Worger et al. | 709/230 |
| 7,020,611 B2* | 3/2006 | Gilde et al. | 704/270.1 |
| 7,020,845 B1* | 3/2006 | Gottfurcht et al. | 715/853 |
| 7,113,767 B2* | 9/2006 | Vaananen | 455/412.1 |
| 7,149,776 B1* | 12/2006 | Roy et al. | 709/205 |
| 7,152,203 B2* | 12/2006 | Gao et al. | 715/240 |
| 7,170,863 B1* | 1/2007 | Denman et al. | 370/260 |
| 7,243,162 B2* | 7/2007 | O'Neill et al. | 709/245 |
| 7,366,752 B2* | 4/2008 | Stawikowski et al. | 709/202 |
| 2002/0065944 A1* | 5/2002 | Hickey et al. | 709/310 |
| 2002/0138265 A1* | 9/2002 | Stevens et al. | 704/251 |
| 2002/0143853 A1* | 10/2002 | Isaac et al. | 709/201 |
| 2002/0165988 A1* | 11/2002 | Khan et al. | 709/246 |
| 2002/0194388 A1* | 12/2002 | Boloker et al. | 709/310 |
| 2003/0018700 A1* | 1/2003 | Giroti et al. | 709/201 |
| 2003/0023691 A1* | 1/2003 | Knauerhase | 709/206 |
| 2003/0023953 A1* | 1/2003 | Lucassen et al. | 717/106 |
| 2003/0046316 A1* | 3/2003 | Gergic et al. | 707/513 |
| 2003/0046346 A1* | 3/2003 | Mumick et al. | 709/205 |
| 2003/0071833 A1* | 4/2003 | Dantzig et al. | 345/700 |
| 2003/0083879 A1* | 5/2003 | Cyr et al. | 704/270 |
| 2003/0105812 A1* | 6/2003 | Flowers et al. | 709/203 |
| 2003/0154085 A1* | 8/2003 | Kelley | 704/275 |
| 2003/0158736 A1* | 8/2003 | James et al. | 704/270.1 |
| 2003/0182622 A1* | 9/2003 | Sibal et al. | 715/511 |
| 2003/0225825 A1* | 12/2003 | Healey et al. | 709/203 |
| 2004/0006474 A1* | 1/2004 | Gong et al. | 704/270.1 |
| 2004/0025115 A1* | 2/2004 | Sienel et al. | 715/513 |
| 2004/0141597 A1* | 7/2004 | Giacomelli | 379/88.17 |
| 2004/0202117 A1* | 10/2004 | Wilson et al. | 370/310 |

OTHER PUBLICATIONS

First Office Action received for Chinese Patent Application No. 02829885.3, mailed May 9, 2008, 13 pages.

PCT Search Report received for PCT/CN2002/000807, mailed Apr. 17, 2003, 6 pages.

International Preliminary Report on Patentability for PCT/CN2002/000807, mailed Jan. 27, 2005, 4 pages.

Supplementary European Search Report for European Patent App. No. 02782634.6-2413, mailed Jul. 29, 2011, 6 pages.

Official Communication for European Patent Application No. 02782634.6, mailed Jan. 16, 2013, 4 pages.

* cited by examiner

MULTI-MODAL WEB INTERACTION OVER WIRELESS NETWORK

CROSS-REFERENCE TO RELATED APPLICATIONS

This application is a continuation of, and claims priority to, co-pending U.S. application Ser. No. 10/534,661, filed on Nov. 10, 2005, which claims priority benefit International Application No. PCT/CN2002/000807, filed on Nov. 13, 2002, both herein incorporated by reference.

FIELD OF INVENTION

This invention relates to web interaction over a wireless network between wireless communication devices and an Internet application. Particularly, the present invention relates to multi-modal web interaction over wireless network, which enables users to interact with an Internet application in a variety of ways.

BACKGROUND OF THE INVENTION

Wireless communication devices are becoming increasingly prevalent for personal communication needs. These devices include, for example, cellular telephones, alphanumeric pagers, "palmtop" computers, personal information managers (PIMS), and other small, primarily handheld communication and computing devices. Wireless communication devices have matured considerably in their features and now support not only basic point-to-point communication functions like telephone calling, but more advanced communications functions, such as electronic mail, facsimile receipt and transmission, Internet access and browsing of the World Wide Web, and the like.

Generally, conventional wireless communication devices have software that manages various handset functions and the telecommunications connection to the base station. The software that manages all the telephony functions is typically referred to as the telephone stack. The software that manages the output and input, such as key presses and screen display, is referred to as the user interface or Man-Machine-Interface or "MMI.

U.S. Pat. No. 6,317,781 discloses a markup language based man-machine interface. The man-machine interface provides a user interface for the various telecommunications functionality of the wireless communication device, including dialing telephone numbers, answering telephone calls, creating messages, sending messages, receiving messages, and establishing configuration settings, which are defined in a well-known markup language, such as HTML, and accessed through a browser program executed by the wireless communication device. This feature enables direct access to Internet and World Wide web content, such as web pages, to be directly integrated with telecommunication functions of the device, and allows web content to be seamlessly integrated with other types of data, because all data presented to the user via the user interface is presented via markup language-based pages. Such a markup language based man-machine interface enables users directly to interact with an Internet application.

However, unlike conventional desktop or notebook computers, wireless communication devices have a very limited input capability. Desktop or notebook computers have cursor based pointing devices, such as computer mouse, trackballs, joysticks, and the like, and full keyboards. This enables navigation of Web content by clicking and dragging of scroll bars, clicking of hypertext links, and keyboard tabbing between fields of forms, such as HTML forms. In contrast, wireless communication devices have a very limited input capability, typically up and down keys, and one to three soft keys. Thus, even with a markup language based man-machine interface, users of wireless communication devices are unable to interact with an Internet application using conventional technology. Although some forms of speech recognition exist in the prior art, there is no prior art system to realize multi-modal web interaction, which will enable users to perform web interaction over a wireless network in a variety of ways.

BRIEF DESCRIPTION OF THE DRAWINGS

The features of the present invention will be more fully understood by reference to the accompanying drawings, in which.

DETAILED DESCRIPTION

Figure 1:
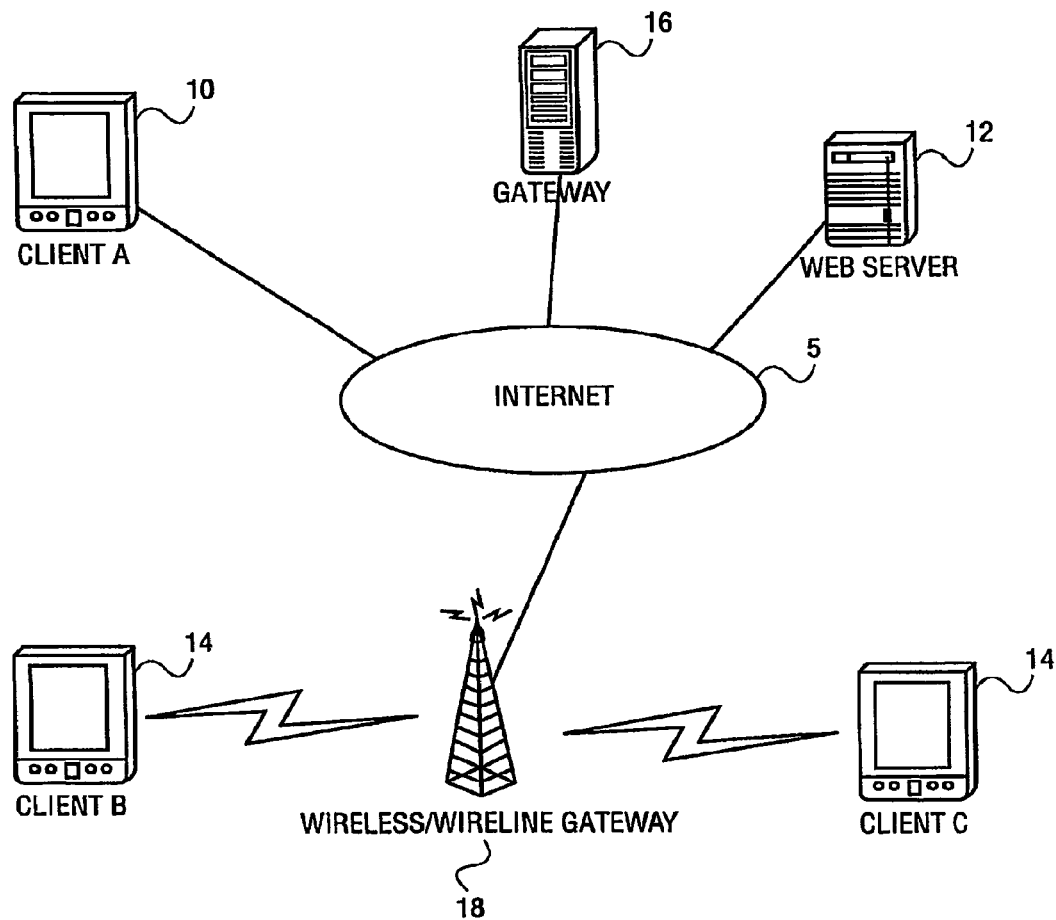
FIG. 1 is an illustration of the network environment in which an embodiment of the present invention may be applied.

In the following detailed description, numerous specific details are set forth in order to provide a thorough understanding of the present invention. However, it will be appreciated by one of ordinary skill in the art that the present invention shall not be limited to these specific details.

Various embodiments of the present invention overcome the limitation of the conventional Man-Machine Interface for wireless communication by providing a system and method for multi-modal web interaction over a wireless network. The multi-modal web interaction of the present invention will enable users to interact with an Internet application in a variety of ways, including, for example:

Input: Keyboard, Keypad, Mouse, Stylus, speech;

Output: Plaintext, Graphics, Motion video, Audio, Synthesis speech.

Each of these modes can be used independently or concurrently. In one embodiment described in more detail below, the invention uses a multi-modal markup language (MML).

In one embodiment, the present invention provides an approach for web interaction over wireless network. In the embodiment, a client system receives user inputs, interprets the user inputs to determine at least one of several web interaction modes, produces a corresponding client request and transmits the client request. The server receives and interprets the client request to perform specific retrieving jobs, and transmits the result to the client system.

In one embodiment, the invention is implemented using a multi-modal markup language (MML) with DSR (Distributed Speech Recognition) mechanism, focus mechanism, synchronization mechanism and control mechanism, wherein the focus mechanism is used for determining which active display is to be focused and the ID of the focused display element. The synchronization mechanism is used for retrieving the synchronization relation between a speech element and a display element to build the grammar of corresponding speech element to deal with user's speech input. The control mechanism controls the interaction between client and server. According to such an implementation, the multi-modal web interaction flow is shown by way of example as follows:

User: point and click using hyperlinks, submit a form (traditional web interaction) or press the "Talk Button" and input an utterance (speech interaction).

Client: receive and interpret the user input. In case of traditional web interaction, the client transmits a request to the server for a new page or submits the form. In case of speech interaction, the client determines which active display element is to be focused and the identifier (ID) of the focused display element, captures speech, extracts speech features, and transmits the speech features, the ID of focused display element and other information such as URL of the current page to the server. The client waits for the corresponding server response.

Server: receive and interpret the request from the client. In the case of traditional web interaction, the server retrieves the new page from cache or web server and sends the page to the client. In the case of speech interaction, the server receives the ID of the focused display element to build the correct grammar based on the synchronization of display elements and speech elements. Then, speech recognition will be performed. According to the result of speech recognition, the server will do specific jobs and send events or new page to the client. Then, the server waits for new requests from the client.

Client: load the new page or handle events.

The various embodiments of the present invention described herein provide an approach to use Distributed Speech Recognition (DSR) technology to realize multi-modal web interaction. The approach enables each of several interaction modes to be used independently or concurrently.

As a further benefit of the present invention, with the focus mechanism and synchronization mechanism, the present invention will enable the speech recognition technology to be feasibly used to retrieve information on the web, improve the precision of speech recognition, reduce the computing resources necessary for speech recognition, and realize real-time speech recognition.

As a further benefit of the present invention, with one implementation based on a multi-modal markup language, which is an extension of XML by adding speech features, the approach of the present invention can be shared across communities. The approach can be used to help Internet Service Providers (ISP) to easily build server platforms for multi-modal web interaction. The approach can be used to help Internet Content Providers (ICP) to easily create applications with the feature of multi-modal web interaction. Specifically, Multi-modal Markup Language (MML) can be used to develop speech applications on the web for at least two scenarios:

Multi-modal applications can be authored by adding MML to a visual XML page for a speech model;

Using the MML features for DTMF input, voice-only applications can be written for scenarios in which a visual display is unavailable, such as the telephone.

This allows content developers to re-use code for processing user input. The application logic remains the same across scenarios: the underlying application does not need to know whether the information is obtained by speech or other input methods.

Referring now to FIG. 1, there is shown an illustration of the network environment in which an embodiment of the invention may be applied. As shown in FIG. 1, client 10 can access documents from Web server 12 via the Internet 5, particularly via the World-Wide Web ("the Web"). AS well known, the Web is a collection of formatted hypertext pages located on numerous computers around the world that are logically connected by the Internet. The client 10 may be personal computers or various mobile computing devices 14, such as personal digital assistants or wireless telephones. Personal digital assistants, or PDA's, are commonly known hand-held computers that can be used to store various personal information including, but not limited to contact information, calendar information, etc. Such information can be downloaded from other computer systems, or can be inputted by way of a stylus and pressure sensitive screen of the PDA. Examples of PDA's are the Palm™ computer of 3Com Corporation, and Microsoft CE™ computers, which are each available from a variety of vendors. A user operating a mobile computing device such as a cordless handset, dual-mode cordless handset, PDA or operating portable laptop computer generates control commands to access the Internet. The control commands may consist of digitally encoded data, DTMF or voice commands. These control commands are often transmitted to a gateway 18. The gateway 18 processes the control commands (including performing speech recognition) from the mobile computing device 14 and transmits requests to the Web server 12. In response to the request, the Web server 12 sends documents to the gateway 18. Then, the gateway 18 consolidates display contents from the document and sends the display contents to the client 14.

According to an embodiment of the present invention for web interaction over wireless network, the client 14 interprets the user inputs to determine a web interaction mode, produces and transmits the client 14 request based on the interaction mode determination result; and multi-modal markup language (MML) server (gateway) 18 interprets the client 14 request to perform specific retrieving jobs. The Web interaction mode can be traditional input/output (for example: keyboard, keypad, mouse and stylus/plaintext, graphics, and motion video) or speech input/audio (synthesis speech) output. This embodiment enables users to browse the World Wide Web in a variety of ways. Specifically, users can interact with an Internet application via traditional input/output and speech input/output independently or concurrently.

In the following section, we will describe a system for web interaction over a wireless network according to one embodiment of the present invention. The reference design we give is one implementation of MML. It extends XHTML Basic by adding speech features to enhance XHTML modules. The motivation for XHTML Basic is to provide an XHTML document type that can be shared across communities. Thus, an XHTML Basic document can be presented on the maximum number of Web clients, such as mobile phones, PDAs and smart phones. That is the reason to implement MML based on XHTML Basic.

XHTML Basic Modules in One Embodiment:
Structure Module; Text Module; Hypertext Module; List Module; Basic Forms Module; Basic Tables Module; Image Module; Object Module; Metainformation Module; Link Module and Base Module.

Other XHTML Modules can Provide More Features:
Script Module: Support client side script.
Style Module: Support inline style sheet.

Figure 2:
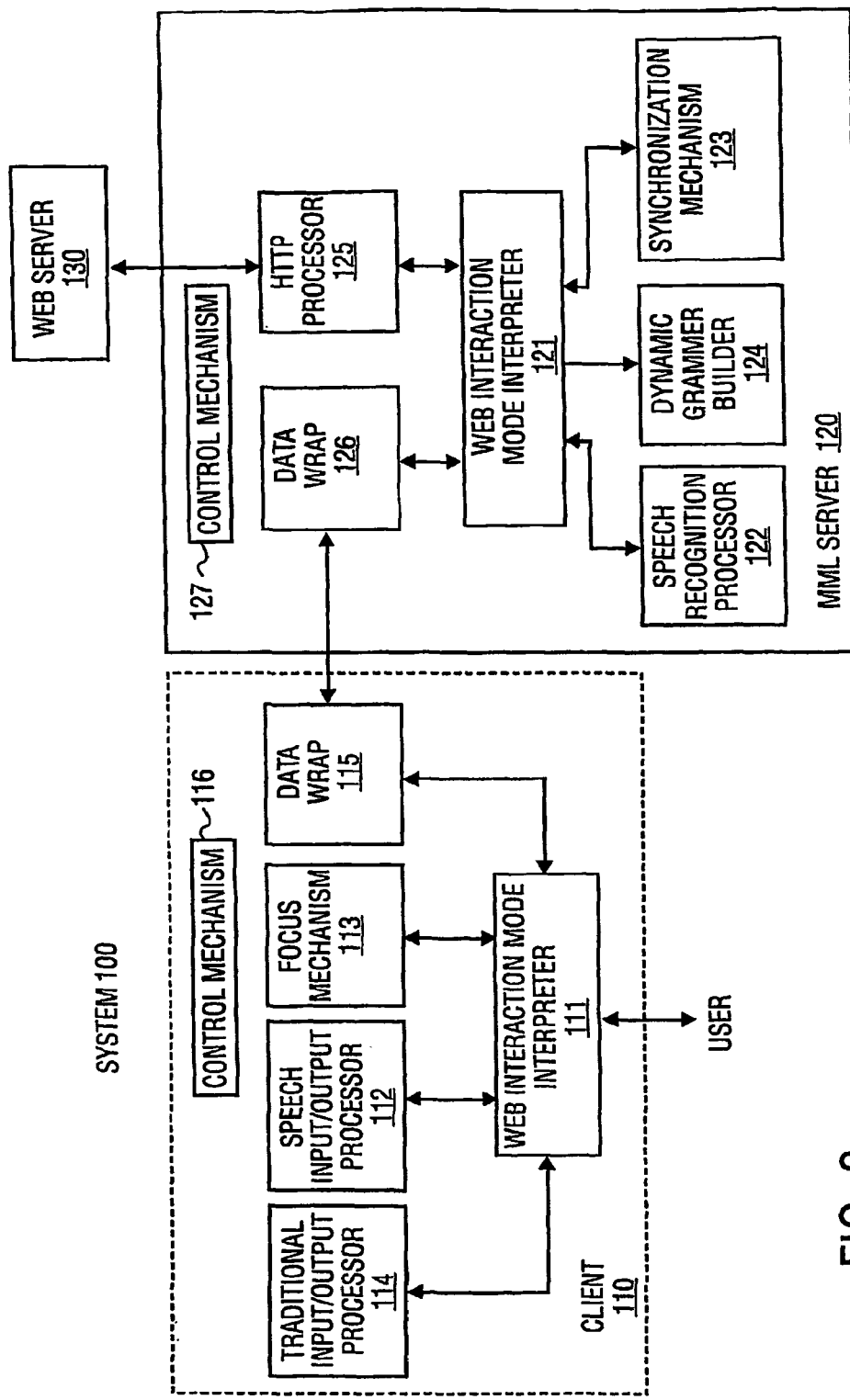
FIG. 2 is an illustration of the system 100 for web interaction over a wireless network according to one embodiment of the present invention.

Referring to FIG. 2, there is shown an illustration of the system 100 for web interaction over a wireless network according to one embodiment of the invention. In FIG. 2, only the components related to the present invention are shown so as not to obscure the invention. As shown in FIG. 2, the client 110 comprises: web interaction mode interpreter 111, speech input/output processor 112, focus mechanism 113, traditional input/output processor 114, data wrap 115 and control mechanism 116. The MML server 120 comprises: web interaction mode interpreter 121, speech recognition processor 122, synchronization mechanism 123, dynamic grammar builder 124, HTTP processor 125, data wrap 126 and control mechanism 127.

In the system 100, at client 110, web interaction mode interpreter 111 receives and interprets user inputs to determine the web interaction mode. The web interaction mode interpreter 111 also assists content interpretation in the client 110. In case of traditional web interaction, traditional input/output processor 114 processes user input, then data wrap 115 transmits a request to the server 120 for a new page or form submittal. In case of speech interaction, speech input/output processor 112 captures and extracts speech features, focus mechanism 113 determines which active display element is to be focused upon and the ID of the focused display element. Then data wrap 115 transmits the extracted speech features, the ID of the focused display element and other information such as URL of current page to the MML server. At MML server 120: web interaction mode interpreter 121 receives and interprets the request from the client 110 to determine the web interaction mode. The web interpretation mode interpreter 121 also assists content interpretation on the server 120. In case of traditional web interaction, HTTP processor 125 retrieves the new page or form from cache or web server 130. In case of speech interaction, synchronization mechanism 123 retrieves the synchronization relation between a speech element and a display element based on the received ID, dynamic grammar builder 124 builds the correct grammar based on the synchronization relation between speech element and display element. Speech recognition processor 122 performs speech recognition based on the correct grammar built by dynamic grammar builder 124. According the recognition result, HTTP processor 125 retrieves the new page from cache or web server 130. Then, data wrap 126 transmits a response to the client 110 based on the retrieved result. The control mechanisms 116 and 127 are used to control the interaction between the client and the server.

The following section is a detailed description of one embodiment of the present invention using MML with a focus mechanism, synchronization mechanism and control mechanism according to the embodiment.

Focus Mechanism

In multi-modal web interaction, besides traditional input methods, speech input can become a new input source. When using speech interaction, speech is detected and feature is extracted at the client, and speech recognition is performed at the server. We note that generally, the user will typically do input using the following types of conventional display element(s):

Hyperlinks: The user can select the hyperlink(s) that is stable.

Form: The user can view and/or modify an electronic form containing information such as stock price, money exchange, flights and the like.

Considering the limitations of current speech recognition technology, in the multi-modal web interaction of the present invention, a focus mechanism is provided to focus the user's attention on the active display element(s) on which the user will perform speech input. A display element is focused by highlighting or otherwise rendering distinctive the display element upon which the user's speech input will be applied. When the identifier (ID) of the focused display element(s) is transmitted to the server, the server can perform speech recognition based on the corresponding relationship between the display element and the speech element. Therefore, instead of conventional dictation with a very large vocabulary, the vocabulary database of one embodiment is based on the hyperlinks, electronic forms, and other display elements on which users will perform speech input. At the same time, at the server, the correct grammar can be built dynamically based on the synchronization of display elements and speech elements. Therefore, the precision of speech recognition will be improved, the computing load of speech recognition will be reduced, and real-time speech recognition will actually be realized.

Figure 3:
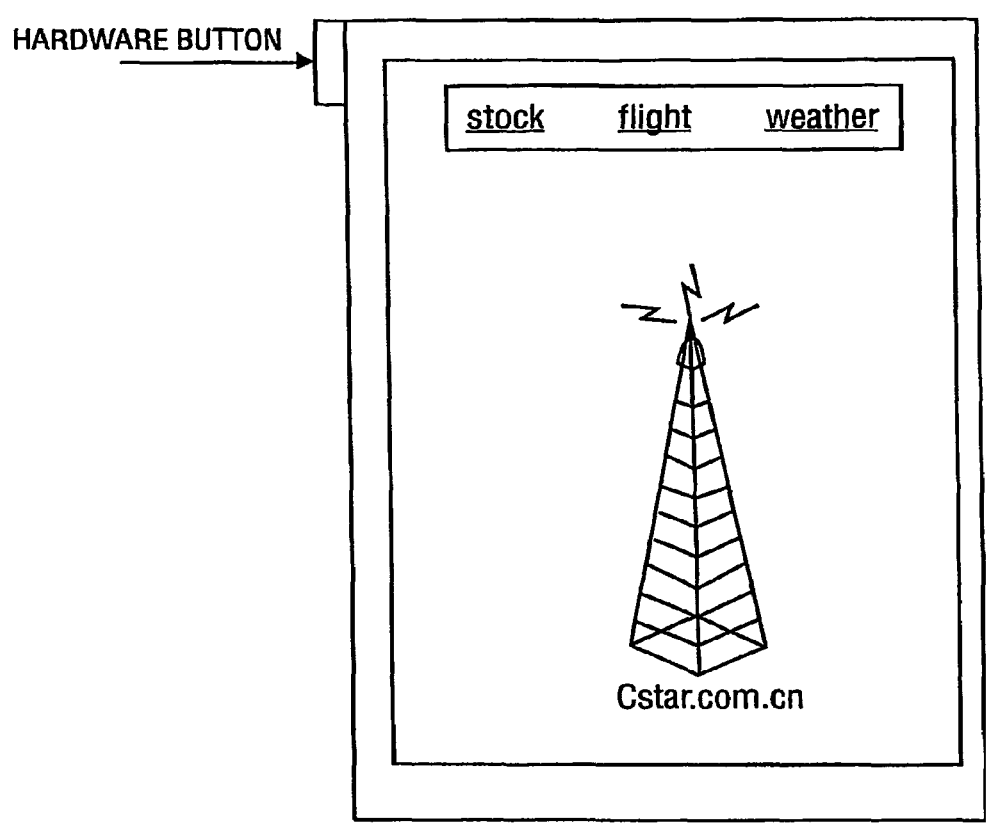
FIG. 3 and FIG. 4 show focus on a group of hyperlinks or a form.
Figure 4:
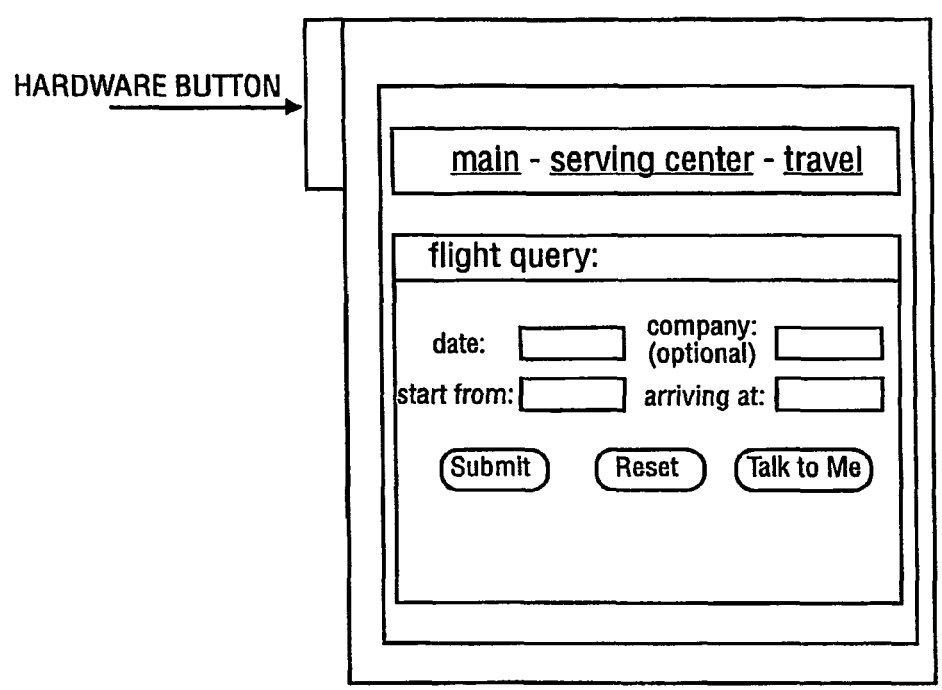

The MMI's of FIG. 3 and FIG. 4 can help to understand the focus processing on the active display element of one embodiment. FIG. 3 shows the focus on a group of hyperlinks, and FIG. 4 shows the focus on a form.

In the conventional XHTML specification, it is not allowed to add a BUTTON out of a form. As our strategy is not to change the XHTML specification, the "Programmable Hardware Button" is adopted to focus a group of hyperlinks in one embodiment. The software button with title of "Talk to Me" is adopted to focus the electronic form display element. It will be apparent to one of ordinary skill in the art that other input means may equivalently be associated with focus for a particular display element.

When a "card" or page of a document is displayed on the display screen, no display element is initially focused. With the "Programmable Hardware Button" or "Talk to Me Button", the user can perform web interaction through speech methods. If the user activates the "Programmable Hardware Button" or "Talk To Me Button", the display element(s) to which the button belongs is focused. Then, possible circumstances might be as follows:

User Speech

Once a user causes focus on a particular display element, an utterance from the user is received and scored or matched against available input selections associated with the focused display element. If the scored utterance is close enough to a particular input selection, the "match" event is produced and new card or page is displayed.

The new card or page corresponds to the matched input selection. If the scored utterance cannot be matched to a particular input selection, a "no match" event is produced, audio or text prompt is displayed and the display element is still focused.

The user may also use traditional ways of causing a particular display element to be focused, such as pointing at an input area, such as a box in a form. In this case, the currently focused display element changes into un-focused as a different display element is selected.

The user may also point to a hypertext link, which causes a new card or page to be displayed. If the user points the other "Talk To Me Button", the previous display element changes into un-focused and the display element, to which the last activation belongs, changes into focused.

If the user does not do anything for longer than the length of a pre-configured timeout, the focused display element may change into un-focused.

Synchronize Mechanism

When the user wishes to provide input on a display element through a speech methodology, the grammar of the corresponding speech elements should be loaded at the server to deal with the user's speech input. So, the synchronization or configuration scheme for the speech element and the display element is necessary. Following are two embodiments which accomplish this result.

One fundamental speech element has one grammar that includes all entrance words for one time speech interaction on the Web.

One of the fundamental speech elements must have one and only one corresponding display element(s) as follows:
One group of hyperlinks
One Form
One identified single or group of display elements.

Thus, it is necessary to perform a binding function to bind speech elements to corresponding display elements. In one embodiment, a "bind" attribute is defined in <mml:link>, <mml:sform>and<mml:input>. It contains the information for one pair of display elements and corresponding speech element.

The following section presents sample source code for such a binding for hyperlink type display elements.

```
<mml:card>
    <a id="stock">stock</a>
    <a id="flight">flight</a>
    <a id="weather">weather</a>
    <mml:speech>
        <mml:recog>
            <mml:group>
                <mml grammar src="grammar.gram" />
                <mml:link value="#stock-gram" bind="stock"/>
                <mml:link value="#flight-gram" bind="flight"/>
                <mml:link value="#weather-gram" bind="weather"/>
            </mml:group>
        </mml:recog>
    </mml:speech>
</mml:card>
```

The following section presents sample source code for a binding in an electronic form, such as an airline flight information form, for example.

```
<mml:card title="flight inquery">
    <script language="javascript">
        function talk1( )
        {
            var sr= new DSR.FrontEnd;
            sr.start("form-flight");
        }
    </script>
<p>flightquery: </p>
    <form id="form-flight" action="flightquery.asp" method="post">
        <p>date: <input type="text" id ="date1" name="date01"/>
        company(optional):<input type="text" id ="company1" name="company01"/>
        </p>
        <p>startfrom: <input type="text" id ="start-from" name="start"/>
            arrivingat:<input type="text" id ="arriving-at" name="end"/>
        </p>
        <p><input type="submit" value="submit"/> <input type="Reset"value="Reset"/>
            <input type="button" value="Talk To Me" onclick="talk1( )"/>
        </p>
    </form>
<mml:speech>
    <mml:recog>
        <mml:sform id="sform-flight" bind="form-flight">
            <mml:grammar src="flight-query.gram"/>
            <mml:input id="sdate" value="#date" bind="date1"/>
            <mml:input id="scompany" value="#company" bind="company1"/>
            <mml:input id="sstart" value="#start" bind="start-from"/>
            <mml:input id="send" value="#end" bind="arriving-at"/>
            <mml:onevent type="match">
                <mml:do target="flight-prompt" type="activation"/>
            </mml:onevent>
        </mml:sform>
        <mml:onevent type="nomatch">
            <mml:do target="prompt1" type="activation"/>
        </mml:onevent>
    </mml:recog>
</mml:speech>
</mml:card>
```

Client-Server Control Mechanism

When performing multi-modal interaction, in order to signal the user agent and server that some actions have taken place, the system messages produced at the client or the server or other events produced at the client or the server should be well defined.

In an embodiment of the present invention, a Client-Server Control Mechanism is designed to provide a mechanism for the definition of the system messages and MML events which are needed to control the interaction between the client and server.

Table 1 includes a representative set of system messages and MML events.

TABLE 1

Control Information Table

| | System Messages | Events | Communicated between client and server |
|---|---|---|---|
| Error (Server) | ✓ | | ✓ |
| Transmission (Server) | ✓ | | ✓ |
| Transmission (Client) | ✓ | | ✓ |
| Ready (Server) | ✓ | | ✓ |
| Session (Client) | ✓ | | ✓ |
| Exit (Client) | ✓ | | ✓ |
| OnFocus*(Client) | ✓ | | ✓ |
| UnFocus*(Client) | ✓ | | |
| Match (Server) | | ✓ | ✓ |
| Nomatch (Server) | | ✓ | ✓ |
| Onload (Client) | | ✓ | |
| Unload (Client) | | ✓ | |

System Messages:

The System Messages are for client and server to exchange system information. Some types of system Messages are triggered by the client and sent to the server. Others are triggered by the server and sent to the client.

In one embodiment, the System messages triggered at the client include the following:

<1>Session Message

The Session message is sent when the client initializes the connection to the server. A Ready message or an Error Message is expected to be received from the server after the Session Message is sent. Below is the example of the Session Message:

```
<message type="session">
    <ip>  </ip>           <!-- the IP address of the requesting client -->
    <type>  </type>       <!-- the device type of the client -->
    <voice>  </voice>     <!-- the voice characters of the user -->
                          <!-- such as man, woman, old man, old woman, child -- >
    <language> </language>    <!-- the language that the user speak -->
    <accuracy> </accuracy>    <!-- the default recognition accuracy that the
client request -->
</message>
```

<2>Transmission Message

The Transmission Message (Client) is sent after the client establishes the session with the server. A Transmission Message (Server) or an Error Message is expected to be received from the server after the Transmission Message (Client) is sent. Below is an example of the Transmission message:

```
<message type="transmission">
    <session></session>       <!-- the ID of this session-->
    <crc>    </crc>           <!-- the crc information that the client
requests-->
    <QoS>   </QoS>    <!-- QoS information that the client requests-->
    <bandwith></bandwith>     <!-- Bandwith that the client requests-->
</message>
```

<3>OnFocus Message

OnFocus and UnFocus messages are special client side System Messages.

OnFocus occurs when user points on, or presses, or otherwise activates the "Talk Button" (Here "Talk Button" means "Hardware Programmable Button" and "Talk to Me Button"). When OnFocus occurs, the client will perform the following tasks:

a. Open the microphone and do Front-end detection b. When the start-point of real speech is captured, do front-end speech processing. The ID of the corresponding focused display element and other essential information (e.g. the URL of current page) is transmitted to the server with the first packet of speech features.

c. When the first packet of speech features reach the server, the corresponding grammar will be loaded into the recognizer and speech recognition will be performed.

Below is an example of the OnFocus message to be transmitted to the server:

```
<message type="OnFocus">
    <session>  <session>     <!--the ID of this session -->
    <id>  </id>              <!--the ID of the focused display
                             element -->
    <url>  <url>             <!--the URL of the document that is
loaded by client now -->
</message>
```

It is recommended that the OnFocus Message be transmitted with speech features rather than transmitted alone. The reason is to optimize and reduce unnecessary communication and server load in these cases:

"When the user switches and presses two different "Talk Buttons" in one card or on one page before entering one utterance, the client will send an unnecessary OnFocus Message to the server and will cause the server to build a grammar unnecessarily."

But a software vendor can choose to implement the OnFocus Message as transmitted alone.

<4>UnFocus Message

When UnFocus occurs, the client will perform the task of closing the microphone. UnFocus occurs in the following cases:

a. User points on, presses or otherwise activates the "Talk Button" of the focused display element.

b. User uses a traditional way like a pointer to point at the input areas such as a box of form and the like.

In the below case, UnFocus will not occur, a. User points on, presses or otherwise activates the "Talk Button" of the unfocused display element while there is a focused display element in the card or page.

<5>Exit Message

The Exit Message is sent when the client quits the session. Below is an example:

```
<message type="exit">
    <session>  <session>   <!-- the ID of this session -->
</message>
```

System Messages Triggered at the Server

<1>Ready Message

The Ready Message is sent by the server when the client sends the Session Message first and the server is ready to work. Below is an example:

```
<message type="ready">
    <session></session>      <!-- the ID of this session which is created by server
after -->
                             <!-- the Session Message is received-->
    <ip></ip>                <!-- the IP address of the responding server -->
    <voice>
        <support>T</support>  <!-- T or F, the server supports or not support the voice
character-->
```

```
                                    <!-- that the client request in Session Message -->
    <server>  </server>             <!-- the voice character that the server is using now-->
>
  </voice>
  <language>
     <support>T</support>           <!-- T or F, the server supports or not support the
language-->
                                    <!-- that the client request in Session
Message -->
     <server></server>              <!-- the language that the server is using now-->
  </language>
  <accuracy>
     <support>T</support>           <!-- T or F, the server supports or not support the
default-->
                                    <!-recognition accuracy that the client request in
Session Message -->
        <server> </server>          <!-- the default recognition accuracy that the server is
using now-->
     </accuracy>
</message>
```

<2>Transmission Message

The Transmission message is sent by the server when the client sends a transmission message first or the network status has changed. This message is used to notify the client of the transmission parameters the client should use. Below is an example:

```
<message type="transmission">
        <session>      </session>      <!-- the ID of this session-->
< crc>             </crc>              <!-- the crc information -->
     <QoS>                </QoS>       <!-- QoS information -->
        <bandwidth> </bandwidth>       <!--the bandwidth which
                                       client should use-->
</message>
```

<3>Error Message

The Error message is sent by the server. If the server generates some error while processing the client request, the server will send an Error Message to the client. Below is an example:

```
<message type="error">
     <session>         </session>     <!-- the ID of this session-->
     <errorcode> 500   </errorcode>   <!-- the code number of the error --
>
     <errorinfo>    </errorinfo>      <!-- the text information of the error-->
</message>
```

MML Events

The purpose of MML events is to supply a flexible interface framework for handling various processing events. MML events can be categorized as client-produced events and server-produced events according to the event source. And the events might need to be communicated between the client and the server.

In the MML definition, the element of event processing instruction is <mml:onevent>. There are four types of events:

Events Trigged at Server

<1>Match Event

When speech processing results in a match, if the page developer adds the processing instructions in the handler of the "nomatch" event in the MML page,

```
<mml:card>
   <form id="form01" action="other.mml" method="post">
       <input id="text1" type="text" name="add" value='上海"/>
   </form>
   ...
   <mml:speech>
      <mml:prompt id="promptServer" type="tts">
         The place you want to go <mml:getvalue from="stext1"
             at="server" />
      </mml:prompt>
      <mml:recog>
         <mml:sform id="sform01" bind="form01">
             <mml:grammar src="Add.gram"/>
             <mml:input id="stext1" value="#add" bind="text1"/>
             <mml:onevent type="match">
                <mml:do target="promptServer" type="activation"/>
             </mml:onevent>
         </mml:sform>
      </mml:recog>
   < /mml:speech>
</mml:card>
``` the event is sent to the client as in the following example:

```
<event type="match">
         <do target="promptServer">
             <input id="stext1" value="place"/>  <!-It's according to the
recognition result -->
</event>
```

If the page developer doesn't handle the "match", no event is sent to the client.

<2>Nomatch Event

When speech processing results in a non-match, if the page developer adds the processing instructions in the handler of the "nomatch" event in the MML page,

```
<mml:onevent type="nomatch">
    <mml:do target="prompt1" type="activate"/>
</mml:onevent>
``` the event is sent to the client as in the following example:

```
<event type="nomatch">
    <do target = "prompt1"/> <!-- Specified by page developer -->
</event>
```

If the page developer doesn't handle the "nomatch", the event is sent to the client as follows:
<event type="nomatch"/>
Events Trigged at Client
<1>Onload Event
The "Onload" event occurs when certain display elements are loaded. This event type could only be valid when the trigger attribute is sent to the "client". The page developer could add the processing instructions in the handler of the "Onload" event in the MML page:

```
<mml:onevent type="onload">
    <mml:do target="prompt1" type="activate"/>
</mml:onevent>
```

No "Onload" event needs to be sent to the server.
<2>Unload Event
The "Unload" event occurs when certain display elements are unloaded. This event type could only be valid when the trigger attribute is sent to the "client". The page developer could add the processing instructions in the handler of the "Onload" event in the MML page,

```
<mml:onevent type="unload">
    <mml:do target="prompt1" type="activate"/>
</mml:onevent>
```

Figure 5:
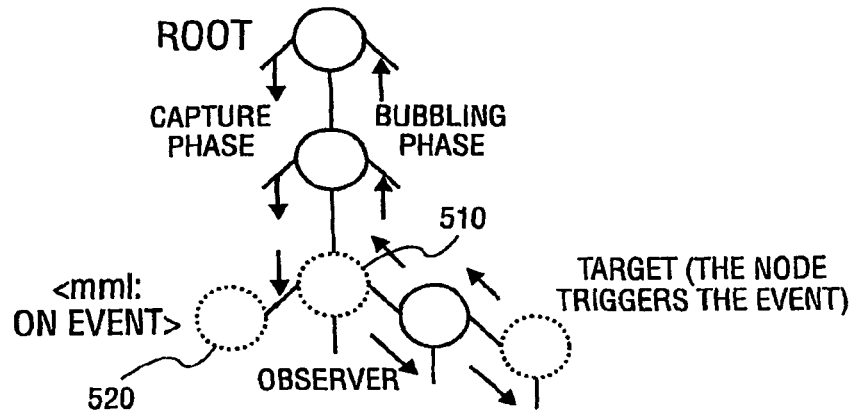
FIGS. 5-6 present the MML event mechanisms.

No "Onload" event need be sent to the server.
MML Events Conformance
The MML Events Mechanism of one embodiment is an extension of the conventional XML Event Mechanism. As shown in FIG. 5, there are two phases in the conventional event handling: "capture" and "bubbling" (See XML Event Conformance).

Figure 6:
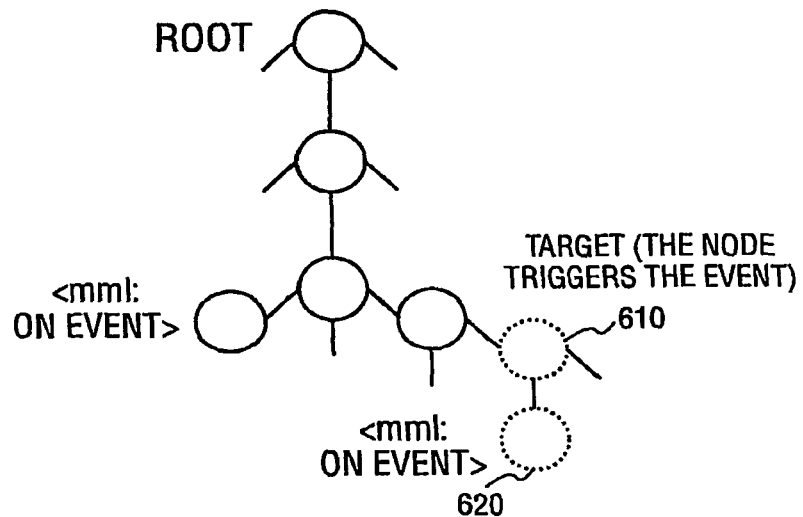

To simplify the Event mechanism, to improve efficiency, and to ease the implementation more, we developed the MML Simple Events Mechanism of one embodiment. As shown in FIG. 6, in the Simple Event Mechanism, neither a "capture" nor "bubbling" phase is needed. In the MML Event Mechanism of one embodiment, the observer node must be the parent of the event handler<mml:onevent>. The event triggered by one node is to be handled only by the child<mml:onevent>event handler node. Other <mml:onevent>nodes will not intercept the event. Further, the phase attribute of <mml:onevent>is ignored.

FIGS. 5 and 6 illustrate the two event mechanisms. The dotted line parent node (node 510 in FIG. 5 and node 610 in FIG. 6) will intercept the event. The child node <mml:onevent>(node 520 in FIG. 5 and node 620 in FIG. 6) of the dotted line node will have the chance to handle the specific events.

MML Events in the embodiment have the unified event interface with the host language (XHTML) but are independent from traditional events of the host language. Page developers can write events in the MML web page by adding a<mml:onevent>tag as the child node of an observer node or a target node.

Figure 7:
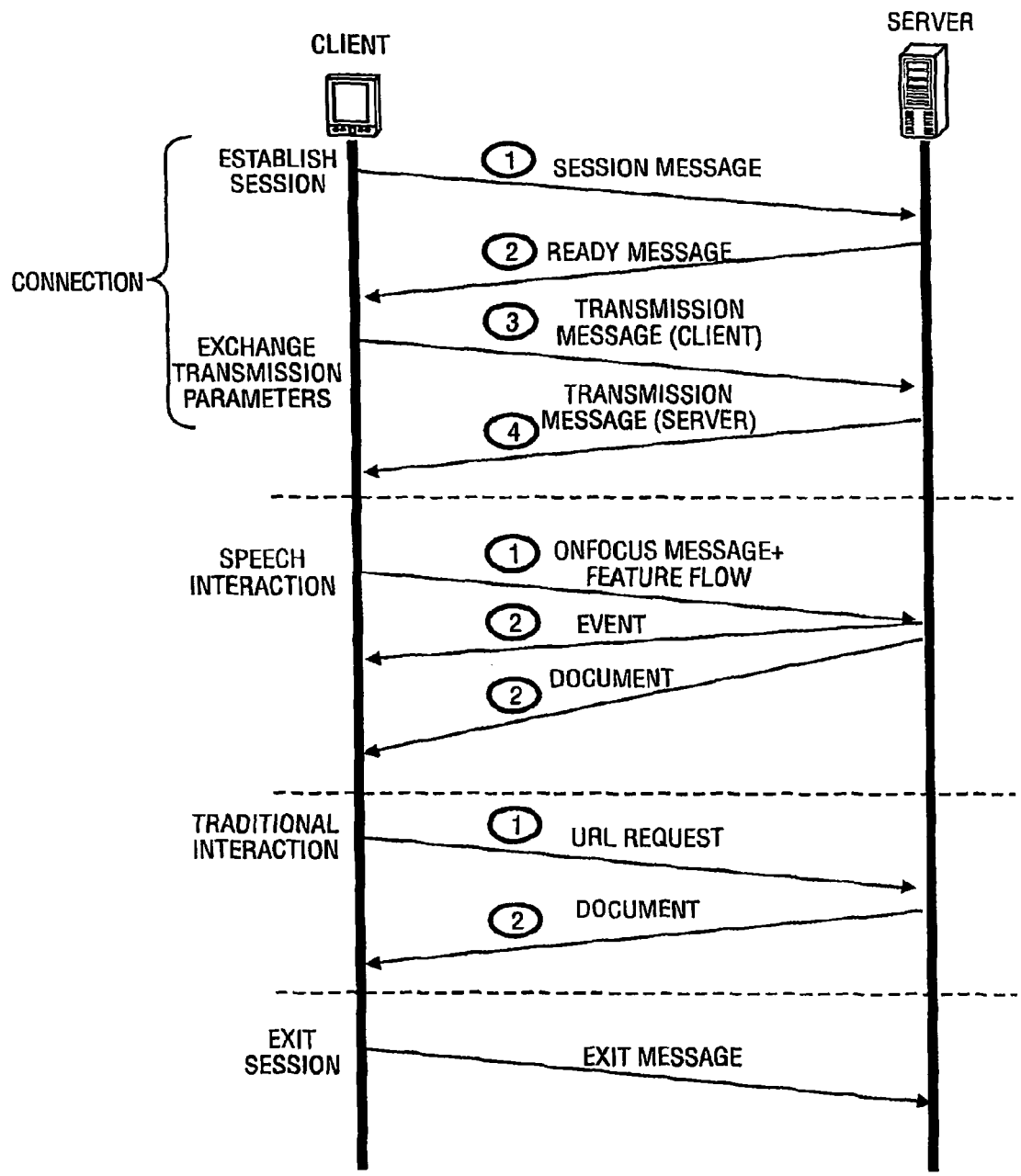
FIG. 7 presents the fundamental flow chart of system messages & MML events.
Figure 8:
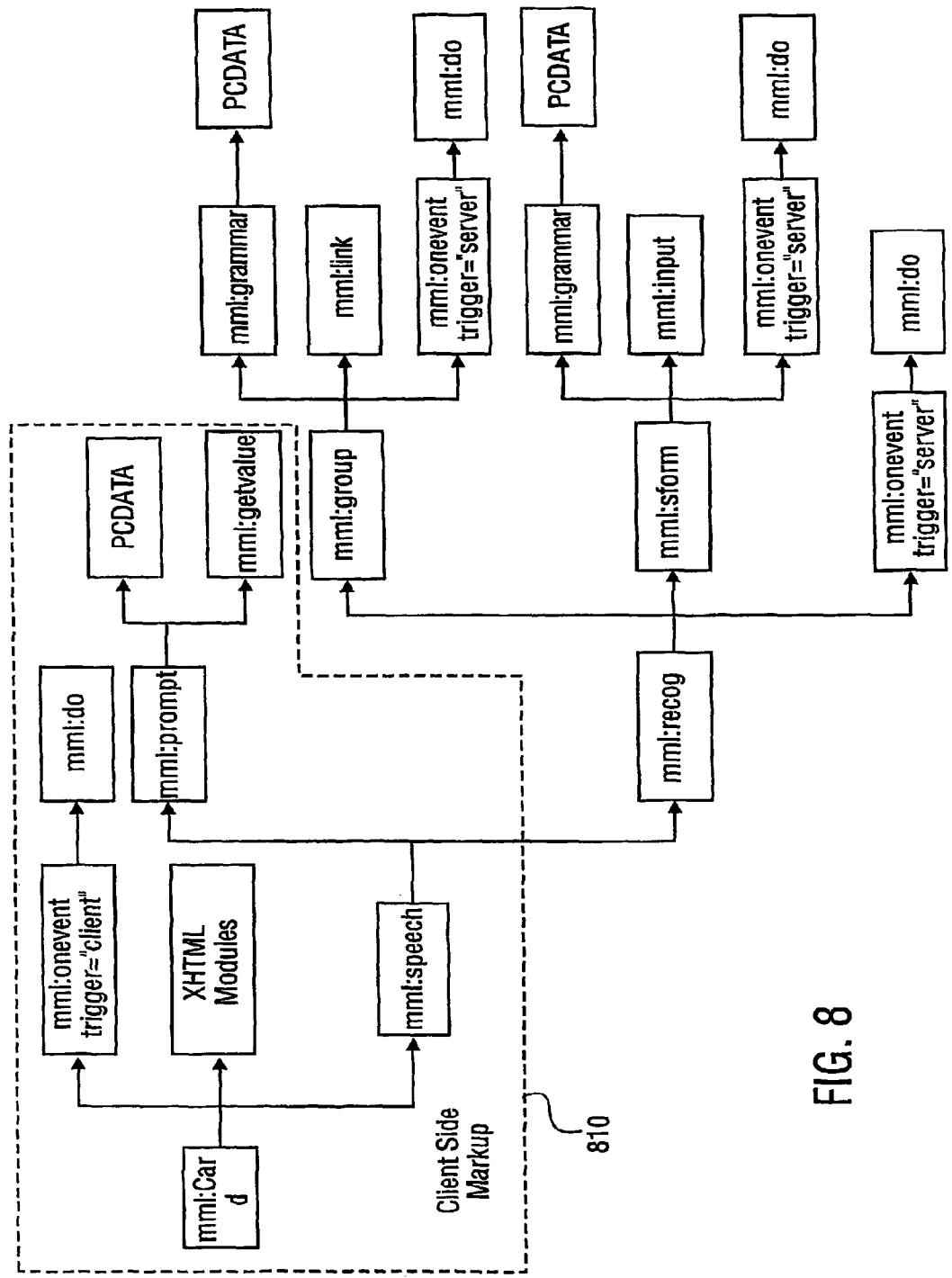
FIG. 8 shows the details of MML element blocks used in the system of one embodiment of the present invention.

FIG. 7 illustrates the fundamental flow chart of the processing of system messages & MML events used in one embodiment of the present invention. This processing can be partitioned into the following segments with the listed steps performed for each segment as shown in FIG. 7.
1) Connection:
Step 1: Session message is sent from client to server
Step 2: Ready message is sent from server to client
Step 3: Transmission message (transmission parameters) is sent from client to server
Step 4: Transmission message (transmission parameters) is sent from server to client
When a mismatch occurs in the above four steps, an error message will be sent to the client from the server.
2) Speech Interaction:
Step 1: Feature Flow with OnFocus message is sent from the client to the server
Step 2: Several cases will happen:
Result Match:
If the implementation includes optional event handling in the MML web page, the event will be sent to client.
If link to new document, the new document will be sent to client.
If link to new card or page within same document, the event with the card or page id will be sent to client.
Result does not Match:
If the implementation includes optional event handling in the MML web page, the nomatch event with event handling information will be sent to client.
If the implementation does not include optional event handling in the MML web page, the nomatch event with empty information will be sent to client.
3) Traditional Interaction:
URL request
New document will be sent to client
4) Exit Session:
If client exits, the exit message will be sent to server As described above, various embodiments of the present invention provide a focus mechanism, synchronization mechanism and control mechanism, which are implemented by MML. MML extends the XHTML Basic by adding speech feature processing. FIG. 8 shows the details of the MML element blocks used in one embodiment of the invention. When a content document is received by the Multi-modal server, a part of the MML element blocks will be sent to the client. The set of MML element blocks sent to the client are shown in FIG. 8 within the dotted line 810. The whole document will be kept in the Multi-modal server.
The Following is the Detailed Explanation for Each MML Element.

| Elements | Attributes | Minimal Content Model |
|---|---|---|
| Html | | ( head, (body \| (mml:card+))) |
| mml:card | id(ID), title(CDATA), style(CDATA) | (mml:onevent*, ( Heading \| Block \| List )*, mml:speech?) |
| mml:speech | id(ID) | (mml:prompt*, mml:recog ?) |

| Elements | Attributes | Minimal Content Model |
|---|---|---|
| mml:recog | id(ID) | (mml:group ?, mml:sform*, mml:onevent*) |
| mml:group | id(ID), mode(speech \| dtmf), accuracy(CDATA) | (mml:grammar; mml:link+, mml:onevent*) |
| mml:link | id(ID), value (CDATA), bind(IDREF) | EMPTY |
| mml:sform | id(ID), mode(speech \| dtmf ), accuracy(CDATA), bind(IDREF) | (mml:grammar, mml:input+, mml:onevent*) |
| mml:input | id(ID), value(CDATA), bind(IDREF) | EMPTY |
| mml:grammar | id(ID), src(CDATA) | PCDATA |
| mml:prompt | id(ID), type(text \|tts \| recorded), src(CDATA), loop(once \| loop), interval(CDATA) | (PCDATA \| mml:getvalue)* |
| mml:onevent | id(ID), type(match \| nomatch \| onload \| unload \|), phase (default \| capture), propagate(continue \| stop), defaultaction(perform \| cancel) | (mml:do)* |
| mml:do | id(ID), target(IDREF), href(CDATA), action(activate \| reset) | EMPTY |
| mml:getvalue | id(ID), from(IDREF), at(client \| server) | EMPTY |

Referring still to FIG. 8, each MML element in one embodiment is described in more detail below. By way of example, MML elements use the namespace identified by the "mml:" prefix.
The<Card>Element:

| Elements | Attributes | Minimal Content Model |
|---|---|---|
| mml:card | id(ID), title(CDATA), style(CDATA) | (mml:onevent*, ( Heading \| Block \| List )*, mml:speech?) |

The function is used to divide the whole document into some cards or pages (segments). The client device will display one card at a time This is optimized for small display devices and wireless transmission. Multiple card elements may appear in a single document. Each card element represents an individual presentation or interaction with the user.

The<mml:card>element is the one and only one element of MML that has relation to the content presentation and document structure.

The optional id attribute specifies the unique identifier of the element in the scope of the whole document.

The optional title attribute specifies the string that would be displayed on the title bar of the user agent when the associated card is loaded and displayed.

The optional style attribute specifies the XHTML inline style. The effect scope of the style is the whole card. But this may be overridden by some child XHTML elements, which could define their own inline style.
The<Speech>Element:

| Elements | Attributes | Minimal Content Model |
|---|---|---|
| mml:speech | id(ID) | (mml:prompt*, mml:recog ?) |

The<mml:speech>element is the container of all speech relevant elements. The child elements of<mml:speech>can be<mml:recog>and/or<mml:prompt>.

The optional id attribute specifies the unique identifier of the element in the scope of the whole document.
The<Recog>Element:

| Elements | Attributes | Minimal Content Model |
|---|---|---|
| mml:recog | id(ID) | (mml:group ?, mml:sform*, mml:onevent*) |

The<mml:recog>is the container of speech recognition elements.

The optional id attribute specifies the unique identifier of the element in the scope of the whole document.
The<Group>Element:

| Elements | Attributes | Minimal Content Model |
|---|---|---|
| mml:group | id(ID), mode(speech \| dtmf), accuracy(CDATA) | (mml:grammar, mml:link+, mml:onevent*) |

The optional id attribute specifies the unique identifier of the element in the scope of the whole document.

The optional mode attribute specifies the speech recognition modes. Two modes are supported:
1. "speech" (default value)
   "speech" mode is the default speech recognition mode.
2. "dtmf"
   "dtmf" is used to receive telephony dtml signal. (This mode is to support traditional phones).

The optional accuracy attribute specifies the lowest accuracy of speech recognition that the page developers will accept. Following styles are supported:
1. "accept" (default value)
   Speech recognizer sets whether the recognition output score is acceptable.
2. "xx" (eg. "60")
   If the output score received from recognizer is equal to or greater than "xx"%, the recognition result will be considered as "match" and the "match" event will be triggered. Otherwise, the result will be considered as "nomatch". The "nomatch" event will be triggered.
The<Link>Element:

| Elements | Attributes | Minimal Content Model |
|---|---|---|
| mml:link | id(ID), value (CDATA), bind(IDREF) | EMPTY |

The optional id attribute specifies the unique identifier of the element in the scope of the whole document.

The required value attribute specifies the <mml:link> element is corresponding to which part of the grammar.

The required bind attribute specifies which XHTML hyperlink (such as <a>) is to be bound with.

The <Sform> Element:

| Elements | Attributes | Minimal Content Model |
|---|---|---|
| mml:sform | id(ID), mode (speech \| dtmf ), accuracy(CDATA), bind(IDREF) | (mml:grammar, mml:input+, mml:onevent*) |

The <mml:sform> element functions as the speech input form. It should be bound with the XHTML <form> element.

The optional id attribute specifies the unique identifier of the element in the scope of the whole document.

The optional mode attribute specifies the speech recognition modes. Two modes are supported:
1. "speech" (default value)
   "speech" mode is the default speech recognition mode.
2. "dtmf"
   "dtmf" mode is used to receive telephony dtml signal. (This mode is to support traditional phones).

The optional accuracy attribute specifies the lowest accuracy of speech recognition that the page developers will accept. Following styles are supported:
3. "accept" (default value)
   Speech recognizer sets whether the recognition output score is acceptable.
4. "xx" (eg. "60")
   If the output score received from recognizer is equal to or greater than "xx"%, the recognition result will be considered as "match" and the "match" event will be triggered. Otherwise, the result will be considered as "nomatch". The "nomatch" event will be triggered.

The <Input> Element:

| Elements | Attributes | Minimal Content Model |
|---|---|---|
| mml:input | id(ID), value(CDATA), bind(IDREF) | EMPTY |

The <mml:input> element functions as the speech input data placeholder. It should be bound with XHTML <input>.

The optional id attribute specifies the unique identifier of the element in the scope of the whole document.

The optional value attribute specifies which part of the speech recognition result should be assigned to the bound XHTML <input> tag. If this attribute is not set, the whole speech recognition result will be assigned to the bound XHTML <input> tag.

The required bind attribute specifies which XHTML <input> in the <form> is to be bound with.

The <Grammar> Element:

| Elements | Attributes | Minimal Content Model |
|---|---|---|
| mml:grammar | id(ID), src(CDATA) | PCDATA |

The <mml:grammar> specifies the grammar for speech recognition.

The optional id attribute specifies the unique identifier of the element in the scope of the whole document.

The optional src attribute specifies the URL of the grammar document.

If this attribute is not set, the grammar content should be in the content of <mml:grammar>

The <Prompt> Element:

| Elements | Attributes | Minimal Content Model |
|---|---|---|
| mml:prompt | id(ID), type(text \|tts \| recorded), src(CDATA), loop(once \| loop), interval(CDATA) | (PCDATA \| mml:getvalue)* |

The <mml:prompt> specifies the prompt message.

The optional id attribute specifies the unique identifier of the element in the scope of the whole document.

The optional type attribute specifies the prompt type. Three types are supported now in one embodiment:
1. "tts" (default value)
   "tts" specifies the speech output is synthesized speech.
2. "recorded"
   "recorded" specifies the speech output is prerecorded audio.
3. "text"
   "text" specifies that the user agent should output the content in Message Box.

If this attribute is set to "text", the client side user agent should ignore the "loop" and "interval" attribute.

If client side user agent has no TTS engine, it may override this "type" attribute from "tts" to "text".

The optional src attribute specifies the URL of the prompt output document.

If this attribute is not set, the prompt content should be in the content of <mml:promt>.

The optional loop attribute specifies how many times should the speech output be activated. Two modes are supported in one embodiment:
1. "once" (default value)
   "once" means no loop.
2. "loop"
   "loop" means the speech output will be played round and round, until the valid scope is changed.

The optional interval attribute specifies the spacing time between two rounds of the speech output. It needs to be set only when the loop attribute is set to "loop". Format:
"xxx" (eg. "5000")
User agent will wait "xxx" milliseconds between the two rounds of the speech output.

The <Onevent> Element:

| Elements | Attributes | Minimal Content Model |
|---|---|---|
| mml:onevent | id(ID), type(match \| nomatch \| onload \| unload ), trigger(client \| server), phase(default \| capture), | (mml:do)* |

-continued

| Elements | Attributes | Minimal Content Model |
|---|---|---|
| | propagate(continue \| stop), defaultaction(perform \| cancel) | |

The<mml:onevent>element is used to intercept certain events.

The user agent (both the client and server) MUST ignore any<mml:onevent> element specifying a type that does not correspond to a legal event for the immediately enclosing element. For example: the server must ignore a<mml:onevent type="onload">in a<mml:sform>element.

The type attribute indicates the name of the event

The optional id attribute specifies the unique identifier of the element in the scope of the whole document.

The required type attribute specifies the event type that would be handled. Following event types are supported in one embodiment:
1. "match"
   "match" event occurs when the result of the speech recognition is accepted. This event type could only be valid when trigger attribute is set to "server".
2. "nomatch"
   "nomatch" event occurs when the result of the speech recognition could not be accepted. This event type could only be valid when trigger attribute is set to "server".
3. "onload"
   "onload" occurs when certain display elements are loaded. This event type could only be valid when trigger attribute is set to "client".
4. "unload"
   "unload" event occurs when certain display elements are unloaded. This event type could only be valid when trigger attribute is set to "client".

"Match" and "nomatch" event type can only be used with speech relevant elements.

"Onload" and "unload" event type can only be used with display elements.

The required trigger attribute specifies the event is desired to occur at client or server side.
1. "client" (default value)
   The event should occur at the client.
2. "server"
   The event is desired to occur at server.

The optional phase attribute specifies when the<mml:onevent>will be activated by the desired event. If user agent (including client and server) supports MML Simple Content Events Conformance, this attribute should be ignored.
1. "default" (default value)<
   mml:onevent>should intercept the event during bubbling phase and on the target element.
2. "capture"
   <mml:onevent>should intercept the event during capture phase.

The optional propagate attribute specifies whether the intercepted event should continue propagating (XML Events Conformance). If the user agent (including client and server) supports MML Simple Content Events Conformance, this attribute should be ignored. The following modes are supported in one embodiment:
1. "continue" (default value)
   The intercepted event will continue propagating.
2. "stop"
   The intercepted event will stop propagating.

The optional defaultaction attribute specifies whether the default action for the event (if any) should be performed or not after handling this event by<mml:onevent>.
For Instance:
The default action of a "match" event on an<mml:sform>is to submit the form. The default action of "nomatch" event on an<mml:sform>is to reset the corresponding<form>and give a "nomatch" message.
Following modes are supported in one embodiment:
1. "perform" (default value)
   The default action is performed (unless cancelled by other means, such as scripting, or by another<mml:onevent>).
2. "cancel"
   The default action is cancelled.
The<Do>Element:

| Elements | Attributes | Minimal Content Model |
|---|---|---|
| Mml:do | Id(ID),target(IDREF), href(CDATA), action(activate \| reset) | EMPTY |

The<mml:do>element is always a child element of an<mml:onevent>element. When the<mml:onevent>element intercepts a desired event, it will invoke the behavior specified by the contained<mml:do>element.

The optional id attribute specifies the unique identifier of the element in the scope of the whole document.

The optional target attribute specifies the id of the target element that will be invoked.

The optional href attribute specifies the URL or Script to the associated behavior. If the target attribute is set, this attribute will be ignored.

The optional action attribute specifies the action type that will be invoked on the target or URL.
1. "activate" (default value)
   The target element or the URL will be activated. The final behavior is dependent on the target element type. For instance: If the target is a HYPERLINK, user agent will traverse it. If the target is a form, it will be submitted.
2. "reset"
   The target element will be set to the initial state.
The<Getvalue>Element:

| Elements | Attributes | Minimal Content Model |
|---|---|---|
| mml:getvalue | id(ID), from(IDREF), at(client\|server) | EMPTY |

The<mml:getvalue>element is a child element of<mml:prompt>. It is used to get the content from<form>or<sform>data placeholder.

The optional id attribute specifies the unique identifier of the element in the scope of the whole document.

The required from attribute specifies the identifier of the data placeholder.

The required at attribute specifies that the value to be assigned is at the client or the server:
1. "client" (default value)
   The<mml:getvalue>get client side element value.
   In this case, the from attribute should be set to a data placeholder of a<form>.

2. "server"

The<mini getvalue>get server side element value.

In this case, the from attribute should be set to a data placeholder of a<sform>.

FOR EXAMPLE:

```
a. <mml:getvalue at="client">:
<mml:card>
    <mml:onevent type="onload">
        <mml:do target="promptclient" type="activation">
    </mml:onevent>
    <form id="form01" action="other.mml" method="post">
        <input id="text1" type="text" name="ADD" value="ShangHai"/>
    </form>
    ...
    <mml:speech>
        <mml:prompt id="promptclient" type="tts">
            the place you want to go, for example<mml:getvalue from="text1" at="client" />
        </mml:prompt>
        ...
    </mml:speech>
</mml:card>
```

The process flow is as follows:

The client user agent loads this card.

The "onload" event will be triggered and then<mml:prompt>will be activated.

Then<mml:getvalue>will be processed. The value of textbox "text1" will be retrieved by<mml:getvalue>. Here the initial value of the textbox is "ShangHai".

Finally, the client will talk to the user: "The place you want to go, for example: ShangHai".

```
b. <mml:getvalue at="server">:
<mml:card>
    <form id="form01" action="other.mml" method="post">
        <input id="text1" type="text" name="add" value="ShangHai"/>
    </form>
    <mml:speech>
        <mml:prompt id="promptServer" type="tts">
            The place you want to go<mml:getvalue from="stext1" at="server" />
        </mml:prompt>
        <mml:recog>
            <mml:sform id="sform01" bind="form01">
                <mml:grammar src="Add.gram"/>
                <mml:input id="stext1" value="#add" bind="text1"/>
                <mml:onevent type="match">
                    <mml:do target="promptServer" type="activation"/>
                </mml:onevent>
            </mml:sform>
        </mml:recog>
    </mml:speech>
</mml:card>
```

The process flow is as follows:

User inputs an utterance and the speech recognition will be performed.

If the speech output score of the speech recognition is acceptable, the "match" event will be triggered.

Before submitting the form, server will process the "match" event handler (<mml:onevent>) first. Then, an event message will be sent to the client as follows:

```
<event type="match">
    <do target="promptServer">
    <input id="stext1" value="地点"/>
    <!-It's according to the recognition result -->
</event>
```

Then, when the client processes the<mml:prompt>and<mml:getvalue at="server">, the value received from the server will be assigned to<mml:getvalue>element.

Finally, the client will talk to the user. The talk content is related to the speech recognition result.

The following section describes the flow of client and server interaction in the system for multi-modal web interaction over wireless network according to one embodiment of the present invention.

Unlike traditional web interaction and telephony interaction, the system of the present invention supports multi-modal web interaction. Because the main speech recognition processing job is handled by the server, the multi-modal web page will be interpreted at both the client and the server side. The following is an example of the simple flow of client and server interaction using an embodiment of the present invention.

<User>: Select hyperlinks, submit a form (traditional web interaction) or press the "Talk Button" and input an utterance (speech interaction).

<Client>: In the case of traditional web interaction, the client transmits a request to the server for a new page or submits the form. In case of speech interaction, the client determines which active display element is to be focused and the ID of the focused display element, captures speech, extracts speech features, and transmits the id of focused display element, the extracted speech features and other information such as URL of the current page to the server. Then, the client waits for a response.

<Server>: In the case of traditional web interaction, the server retrieves the new page from a cache or web server and sends it to the client. In the case of speech recognition, the server receives the id of the focused display element and builds the correct grammar. Then, speech recognition will be performed. According to the result of speech recognition, the server will do specific jobs and send events or new pages to the client. Then, the server waits for a new request from the client.

<Client>: Client will load the new page or handle events.

Thus, an inventive multi-modal web interaction approach with focus mechanism, synchronize mechanism and control mechanism implemented by MML is disclosed. The scope of protection of the claims set forth below is not intended to be limited to the particulars described in connection with the detailed description of various embodiments of the present invention provided herein.

What is claimed is:

1. A method comprising:
   receiving, at a server, a session message from a client device via a network, the session message requesting establishment of a session with the server and comprising (i) a voice type requested by the client device and (ii) a user language requested by the client device;
   determining, at the server, if the requested voice type and the requested user language are supported by the server;

sending, by the server, a ready message to the client device via the network in response to determining that the requested voice type and the requested user language are supported by the server;

receiving, at the server, a client request from the client device via the network subsequent to sending the ready message to the client device, the client request including a focused group of hyperlinks and speech data;

interpreting the client request to identify a selection of at least one of a plurality of web interaction modes, at least one web interaction mode being a speech interaction mode; and building a correct grammar for speech recognition based on the speech data and the focused group of hyperlinks, performing speech recognition, and performing specific tasks according to the result of the speech recognition.

2. A non-transitory machine-readable medium having stored thereon data representing instructions which, when executed by a machine, cause the machine to perform operations, comprising:

receiving a session message from a client device via a network, the session message requesting establishment of a session and comprising (i) a voice type requested by the client device and (ii) a user language requested by the client device;

determining if the requested voice type and the requested user language are supported;

sending a ready message to the client device via the network in response to determining that the requested voice type and the requested user language are supported;

receiving a client request from the client device via the network subsequent to sending the ready message to the client device, the client request including a focused group of hyperlinks and speech data;

interpreting the client request to identify a selection of at least one of a plurality of web interaction modes, at least one web interaction mode being a speech interaction mode; and building a correct grammar for speech recognition based on the speech data and the focused group of hyperlinks, performing speech recognition, and performing specific tasks according to the result of the speech recognition.

3. The method of claim 1, further comprising:

dividing, by the server, the web page into a plurality of multi-modal markup language cards, each multi-modal markup language card comprises a plurality of display elements; and transmitting, by the server, one or more of the plurality of multi-modal markup language cards to the client device.

4. The method of claim 1, further comprising:

determining a recognition output score for the result of the speech recognition; and determining whether the recognition output score meets a threshold percentage of acceptable recognition accuracy.

5. The method of claim 1, further comprising:

determining, by the client device, a period of time during which the client device is inactive; and un-focusing, by the client device, the focused group of hyperlinks in response to determining that the period of time during which the client device is inactive exceeds a reference timeout period of time.

6. The method of claim 1, further comprising highlighting, by the client device, the focused group of hyperlinks.

7. The method of claim 1, wherein the speech data comprises a speech element bound to each hyperlink of the focused group of hyperlinks.

8. The method of claim 1, wherein the focused group of hyperlinks comprises a focused form.

9. The non-transitory machine-readable medium of claim 2, wherein the instructions further cause the machine to perform operations, comprising:

dividing the web page into a plurality of multi-modal markup language cards, each multi-modal markup language card comprises a plurality of display elements; and transmitting one or more of the plurality of multi-modal markup language cards to the client device.

10. The non-transitory machine-readable medium of claim 2, wherein the instructions further cause the machine to perform operations, comprising:

determining a recognition output score for the result of the speech recognition; and determining whether the recognition output score meets a threshold percentage of acceptable recognition accuracy.

11. The non-transitory machine-readable medium of claim 2, wherein the speech data comprises a speech element bound to each hyperlink of the focused group of hyperlinks.

12. The non-transitory machine-readable medium of claim 2, wherein the instructions further cause the machine to perform operations, comprising sending an error message to the client device in response to determining that the requested voice type and the requested user language are not supported.

13. The non-transitory machine-readable medium of claim 2, wherein the instructions further cause the machine to perform operations, comprising receiving requested transmission parameters from the client device subsequent to sending the ready message to the client device, the requested transmission parameters comprising a quality of service (QoS) level and a bandwidth requested by the client device.

14. The non-transitory machine-readable medium of claim 13, wherein the instructions further cause the machine to perform operations, comprising sending, to the client device, the QoS level and the bandwidth to be used by the client device in response to receiving the requested transmission parameters from the client device, wherein receiving a client request from the client device via the network subsequent to sending the ready message to the client device comprising receiving a client request from the client device via the network subsequent to sending, to the client device, the QoS level and the bandwidth to be used by the client device.

15. The non-transitory machine-readable medium of claim 2, wherein the instructions further cause the machine to perform operations, comprising sending, to the client device, a quality of service (QoS) level and a bandwidth to be used by the client device in response to a change in network status.

16. The method of claim 1, further comprising sending, by the server, an error message to the client device in response to determining that the requested voice type and the requested user language are not supported by the server.

17. The method of claim 1, wherein the requested user language comprising a language spoken by a user of the client device.

18. The method of claim 1, further comprising receiving, at the server, requested transmission parameters from the client device subsequent to sending the ready message to the client device, the requested transmission parameters comprising a quality of service (QoS) level and a bandwidth requested by the client device.

19. The method of claim 18, further comprising sending, by the server to the client device, the QoS level and the bandwidth to be used by the client device in response to receiving the requested transmission parameters from the client device,
  wherein receiving, at the server, a client request from the client device via the network subsequent to sending the ready message to the client device comprising receiving, at the server, a client request from the client device via the network subsequent to sending, by the server to the client device, the QoS level and the bandwidth to be used by the client device.

20. The method of claim 1, further comprising sending, by the server to the client device, a quality of service (QoS) level and a bandwidth to be used by the client device in response to a change in network status.

* * * * *